(12) United States Patent
Man

(10) Patent No.: US 11,846,384 B1
(45) Date of Patent: Dec. 19, 2023

(54) TILT ANGLE ADJUSTMENT MECHANISM CAPABLE OF BOTH DISCRETE AND FINE ADJUSTMENT

(71) Applicant: Kaper Industrial Limited, New Territories (HK)

(72) Inventor: Shiu-Fai Stephen Man, New Territories (HK)

( * ) Notice: Subject to any disclaimer, the term of this patent is extended or adjusted under 35 U.S.C. 154(b) by 0 days.

(21) Appl. No.: 17/992,908

(22) Filed: Nov. 22, 2022

(51) Int. Cl.
*F16M 13/04* (2006.01)
*F21V 21/30* (2006.01)
*F16M 11/18* (2006.01)
*F16M 11/10* (2006.01)

(52) U.S. Cl.
CPC ............ *F16M 13/04* (2013.01); *F16M 11/10* (2013.01); *F16M 11/18* (2013.01); *F21V 21/30* (2013.01)

(58) Field of Classification Search
CPC ........ F16M 13/04; F16M 11/10; F16M 11/18; F21V 21/30
USPC ...................................... 248/292.12
See application file for complete search history.

(56) References Cited

U.S. PATENT DOCUMENTS

| | | | | |
|---|---|---|---|---|
| 2,353,537 A * | 7/1944 | Arnesen | ............... | A61B 3/0008 362/105 |
| 3,285,242 A * | 11/1966 | Wallace | ............... | G02B 6/0006 D24/231 |
| 6,896,389 B1 * | 5/2005 | Paul | ...................... | F21V 21/084 362/105 |
| 8,359,672 B2 * | 1/2013 | Moelker | ................ | A42B 3/145 2/418 |
| 2006/0245175 A1 * | 11/2006 | Heine | .................... | A61B 90/50 362/105 |
| 2008/0205036 A1 * | 8/2008 | Tarter | ...................... | F21V 21/30 362/105 |
| 2023/0232105 A1 * | 7/2023 | Hausen | ................ | F16M 11/123 348/207.99 |

\* cited by examiner

*Primary Examiner* — Muhammad Ijaz

(57) ABSTRACT

A tilt angle adjustment mechanism capable of both discrete and fine adjustment includes a bracket, a housing tiltably connected to the bracket and a wheel disposed between the bracket and the housing and rotatably connected to the bracket. A spiral guiding member is provided on the wheel and engages with a curved row of evenly spaced detents at the housing to fix the housing to the wheel at plural predetermined tilt angles defined by the detents to achieve discrete tilt angle adjustment of the housing, and rotation of the wheel drives the spiral guiding member to slide through the curved row of detents and causes the tilt angle of the housing to continuously change with the rotation.

7 Claims, 5 Drawing Sheets

TILT ANGLE ADJUSTMENT MECHANISM CAPABLE OF BOTH DISCRETE AND FINE ADJUSTMENT

BACKGROUND OF THE INVENTION

The present invention relates to a tilt angle adjustment mechanism capable of both discrete and fine adjustment of the tilt angle of a device housing such as a headlamp housing relative to a bracket.

Personal headlamps available in the prior art are commonly provided with tilt angle adjustment brackets which utilize certain snap mechanisms for adjusting the light of the headlamps to be directed to different angles. However, such mechanisms are capable of directing the light to a predetermined number of discrete angles only. It is impossible to further fine tune the tilt angle between successive discrete angles.

BRIEF SUMMARY OF THE INVENTION

In view of the aforesaid disadvantages now present in the prior art, an object of the present invention is to provide a tilt angle adjustment mechanism capable of both discrete and fine adjustment of the tilt angle of a device housing such as a headlamp housing relative to a bracket.

To attain this, the present invention comprises a bracket, a housing and a wheel. The housing is tiltably connected to the bracket so as to tilt around a tilt axis relative to the bracket in a predetermined range of tilt angles. The wheel is disposed between the bracket and the housing for adjusting the tilt angle of the housing; the wheel is rotatably connected to the bracket so as to rotate around a rotation axis which is perpendicular to a planar surface of the wheel and perpendicular to the tilt axis. A spiral guiding member is disposed on the planar surface of the wheel which faces towards the housing. A curved row of evenly spaced detents is provided at the housing for engaging with the spiral guiding member, which is pressed towards the curved row of detents by a biasing means, to fix the housing to the wheel at plural predetermined tilt angles defined by the detents to achieve discrete tilt angle adjustment of the housing, and rotation of the wheel drives the spiral guiding member to slide through the curved row of detents and causes the tilt angle of the housing to continuously change with the rotation.

In some embodiments, the spiral guiding member is in form of an approximately one-turn spiral with a first end portion adjacent to an inner side of a second end portion to allow two successive detents to respectively engage with the first end portion and the second end portion.

In some embodiments, the spiral guiding member is in form of a ridge protruding from the wheel, and the curved row of detents comprises a plurality of detent grooves.

In some embodiments, the detent grooves are defined by gaps between arc shaped ridges protruding from the housing.

In some embodiments, the biasing means is in form of a spring arm disposed on the bracket which presses on the wheel at a position corresponding to where the spiral guiding member and the curved row of detents are engaged.

In some embodiments, the curved row of evenly spaced detents is provided in middle of a bottom edge of a side of the housing which faces towards the wheel.

In some embodiments, the wheel is knurled at its periphery.

DETAILED DESCRIPTION OF THE INVENTION

The present invention is further described in detail with the following embodiment.

Figure 1:
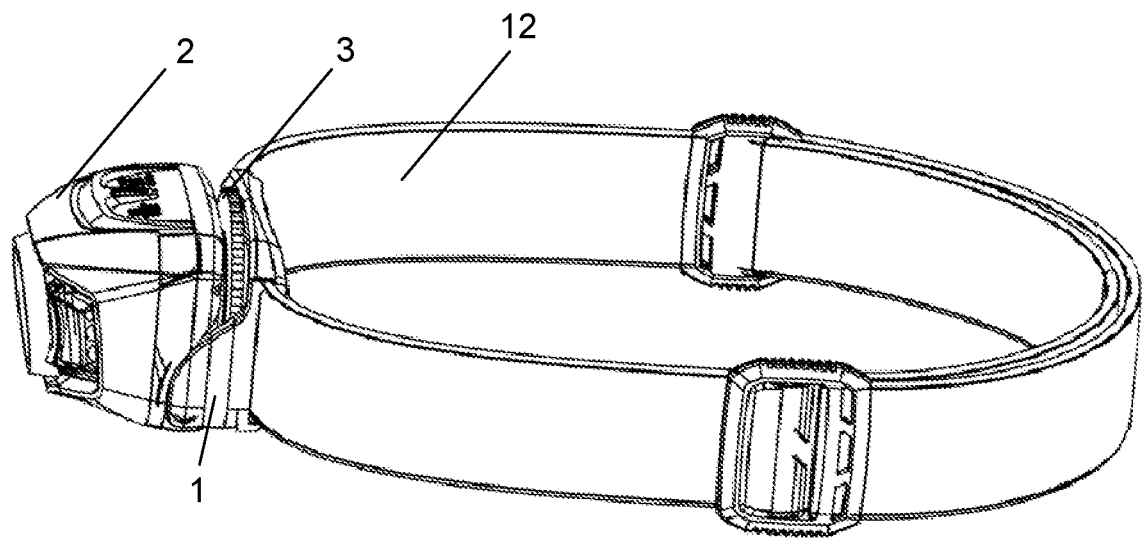
FIG. 1 is a perspective view of an embodiment of the present invention.
Figure 2:
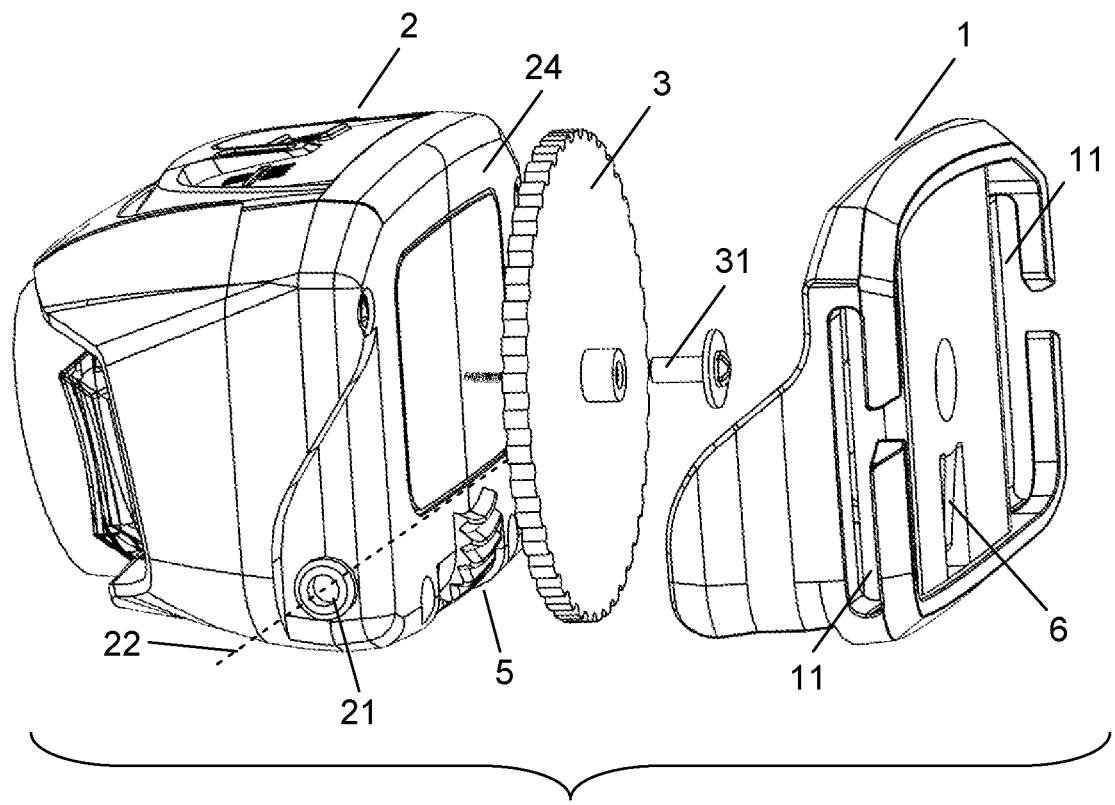
FIG. 2 is a disassembling view of the embodiment of the present invention as shown in FIG. 1 with the head strap removed.
Figure 3:
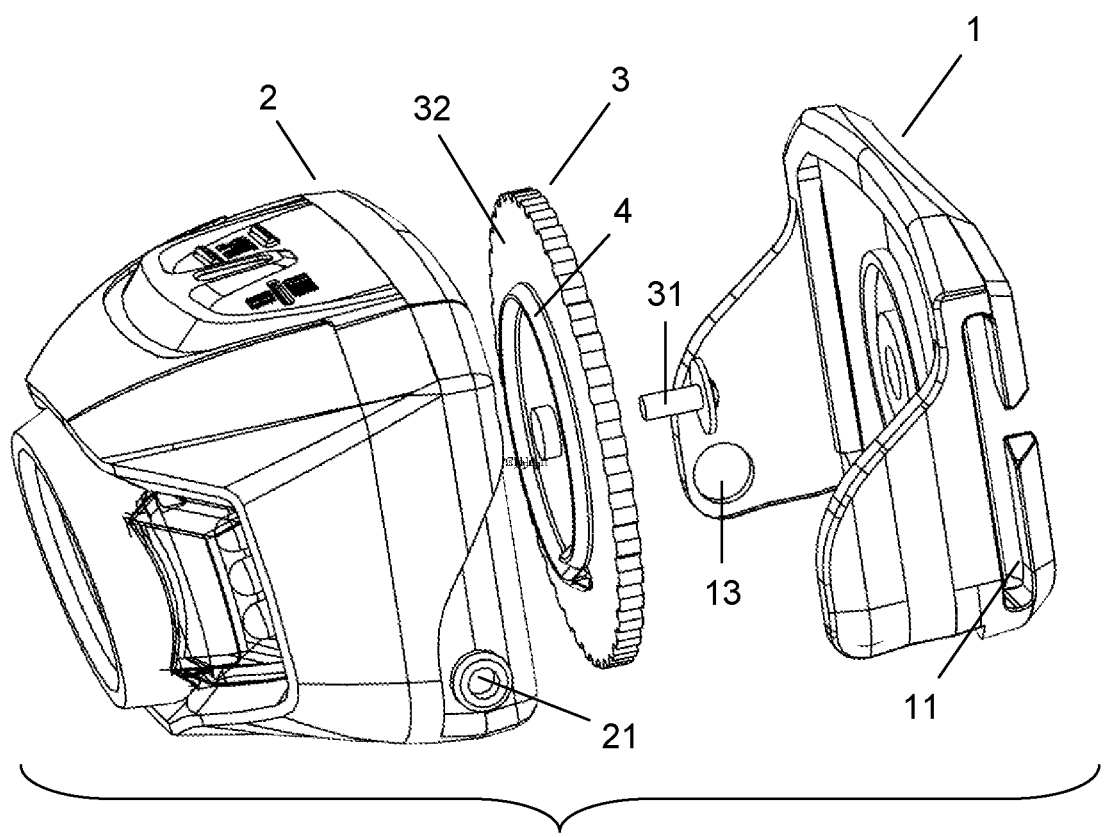
FIG. 3 is another disassembling view of the embodiment of the present invention as shown in FIG. 1 with the head strap removed.
Figure 4:
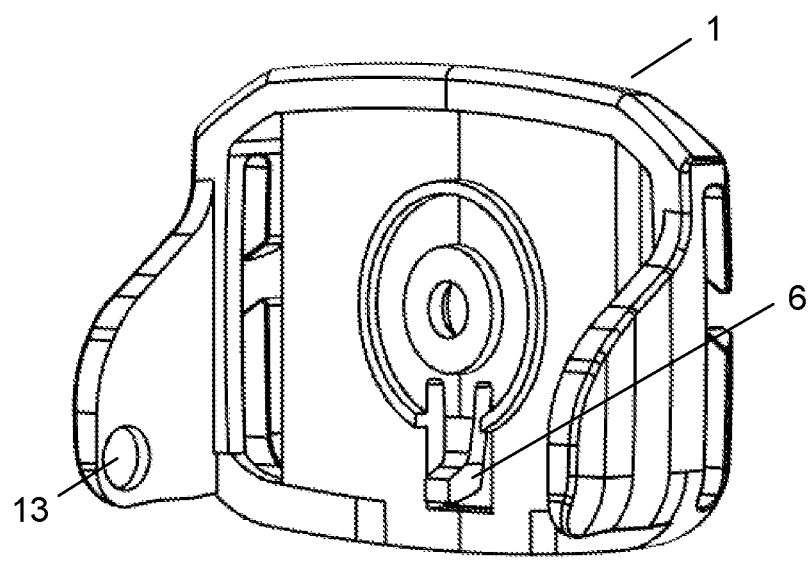
FIG. 4 is a perspective view of the bracket of the embodiment of the present invention as shown in FIG. 1.
Figure 5:
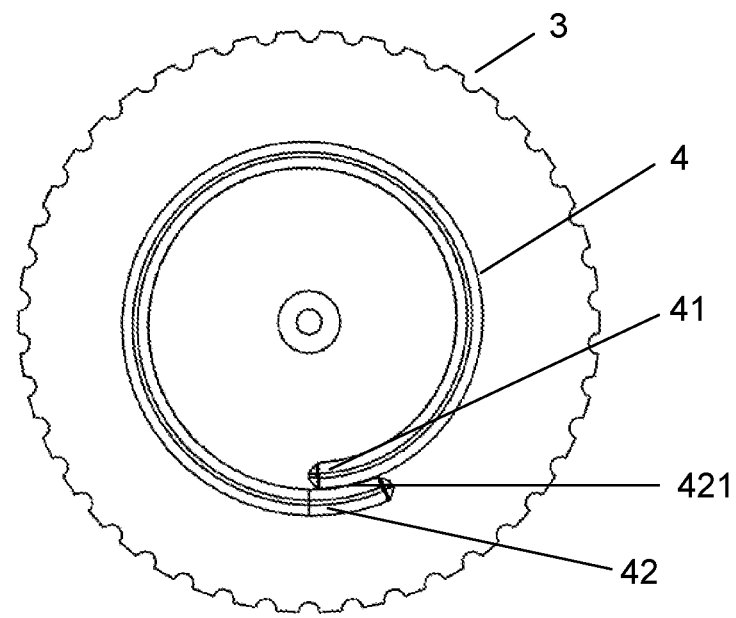
FIG. 5 is a front view of the wheel of the embodiment of the present invention as shown in FIG. 1.
Figure 6:
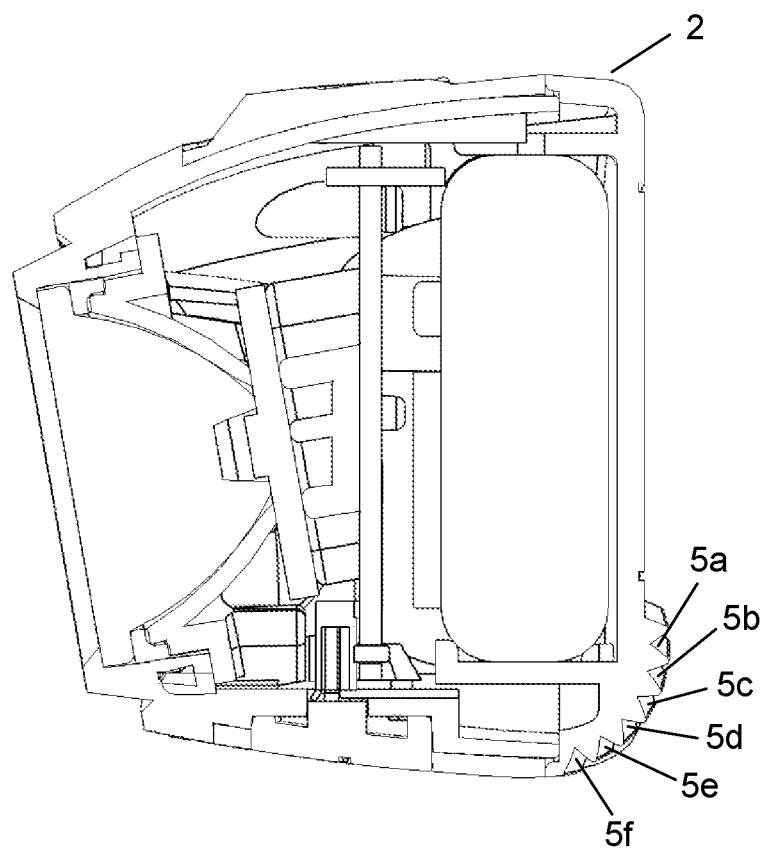
FIG. 6 is a sectional view of the housing of the present invention as shown in FIG. 1
Figure 7:
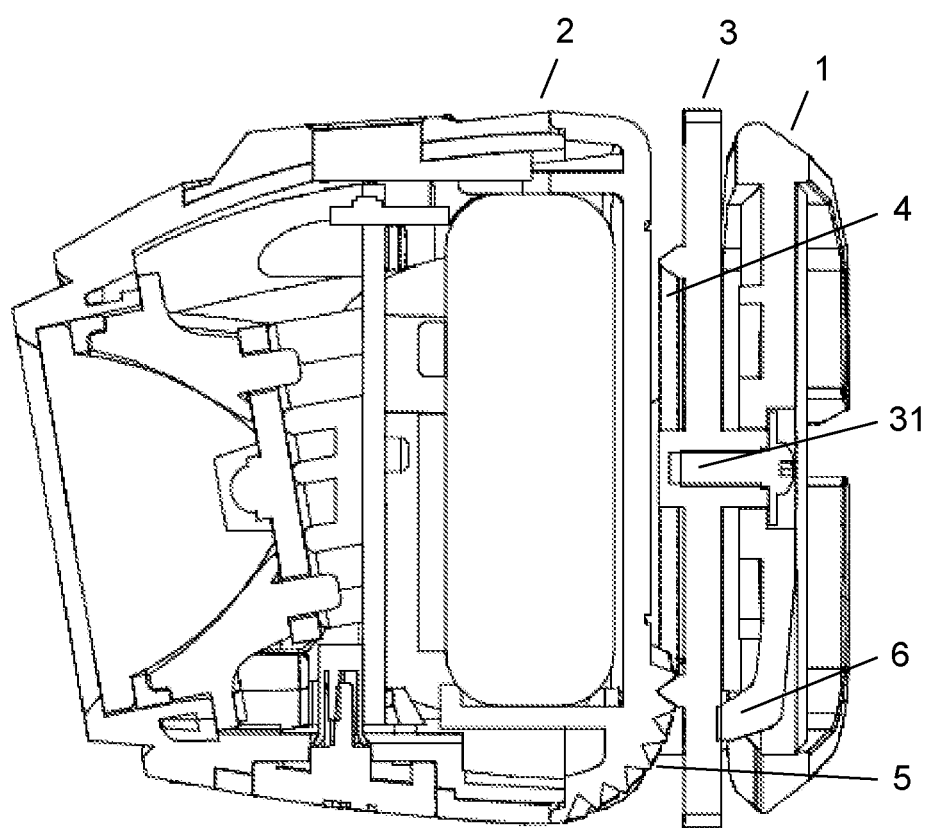
FIG. 7 is a sectional view of the housing being engaged with the wheel and the bracket at the upright position.
Figure 8:
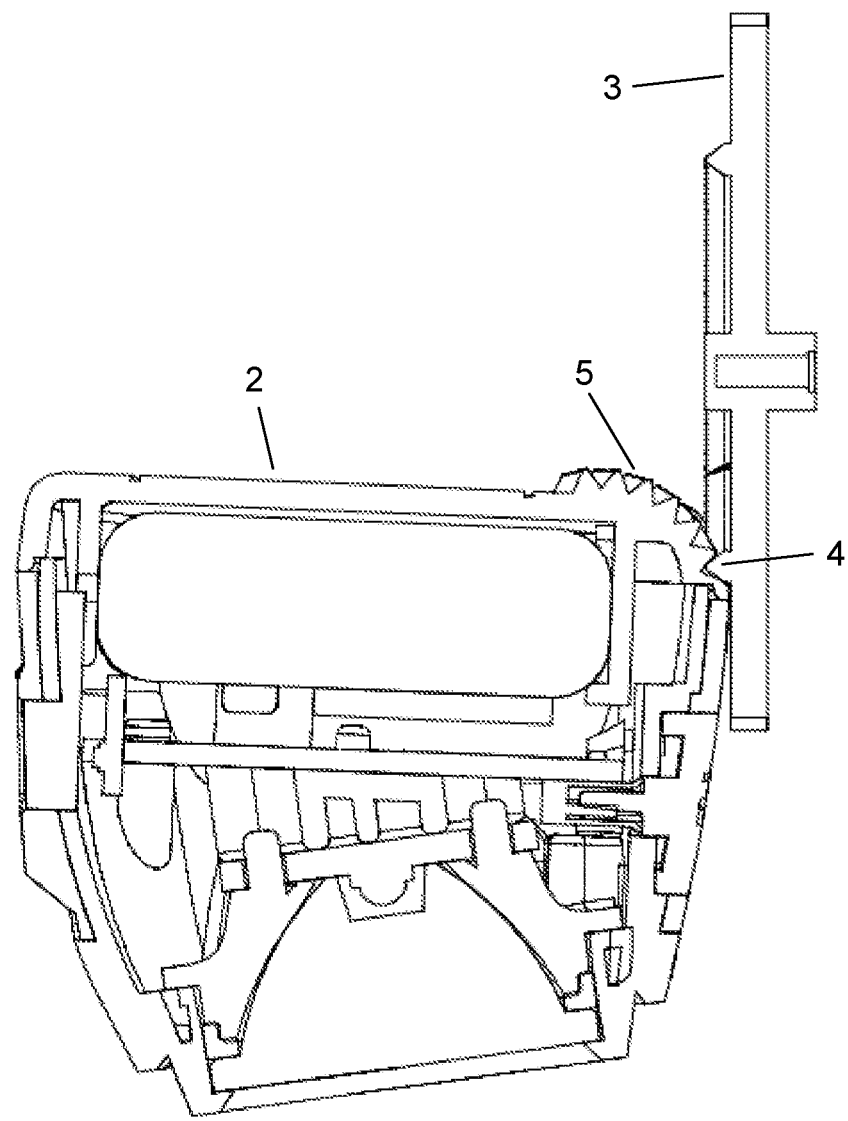
FIG. 8 is a sectional view of the housing being engaged with the wheel at the largest tilt angle.

As illustrated in FIGS. 1 to 7, an embodiment of the present invention is a tilt angle adjustment mechanism for a personal headlamp wearable on a user's head which comprises a bracket 1, a housing 2 and a wheel 3. In other embodiments, the tilt angle adjustment mechanism could also be applied to other devices such as video cameras and so forth.

The bracket 1 has a pair of slots 11 at two sides thereof for a head strap 12 to pass through. The housing 2 receives the operative elements of the headlamp such as the battery, light emitting member and so forth. As the operative elements of the headlamp are commonly known in the art, they are not detailed herein. The housing 2 is tiltably connected to the bracket 1 by rotational engagement of two annular protrusions 21 at two sides of the housing 2 with two corresponding annular recesses 13 at two sides of the bracket 1, so as to tilt around a tilt axis 22 relative to the bracket 1 in a predetermined range of tilt angles 23.

The wheel 3 is disposed between the bracket 1 and the housing 2 for adjusting the tilt angle 23 of the housing 2. The wheel 3 is rotatably connected to the bracket 1 so as to rotate around a rotation axis 31. In this embodiment, the rotation axis 31 is in form of a bolt shaft which is perpendicular to a planar surface 32 of the wheel 3 and perpendicular to the tilt axis 22. The wheel 3 is knurled at its periphery to facilitate the user to rotate the wheel 3.

A spiral guiding member 4 is disposed on the planar surface 32 of the wheel 3 which faces towards the housing 2. In this embodiment, the spiral guiding member 4 is in form of an approximately one-turn spiral ridge protruding from the wheel 3 with a first end portion 41 adjacent to an inner end 421 of a second end portion 42. The distance from the spiral guiding member 4 to the center of the wheel 3 increases in a counter-clockwise direction from the first end portion 41 to the second end portion 42.

A curved row of evenly spaced detents 5 is provided in middle of a bottom edge of a rear side 24 of the housing 2 which faces towards the wheel 3. In this embodiment, the curved row of detents 5 comprises six detent grooves 5a, 5b, 5c, 5d, 5e, 5f that are in identical arc shape and evenly spaced. The six detent grooves 5b, 5c, 5d, 5e, 5f are defined by the gaps between arc shaped ridges protruding from the housing 2. The six detent grooves 5a, 5b, 5c, 5d, 5e, 5f are each configured to engage with the spiral guiding member 4, and two successive detent grooves may respectively engage with the first end portion 41 and the second end portion 42 of the spiral guiding member 4.

The spiral guiding member 4 is pressed towards the curved row of detents by a biasing means 6. The biasing means 6 in this embodiment is in form of a spring arm disposed on the bracket 1 which presses the wheel 3 at a position corresponding to where the spiral guiding member 4 and the curved row of detents 5 are engaged. Engagement of the curved row of detents 5 with the spiral guiding member 4 fixes the housing 2 to the wheel 3 at plural predetermined tilt angles 23 defined by the detent grooves 5a-5f to achieve discrete tilt angle adjustment of the housing 2.

The tilting operation of the housing 2 relative to the bracket 1 is explained in detail as follows. Initially, the housing 2 is at an upright position where the rear side 24 of the housing 2 is substantially parallel to the wheel 3, and the tilt angle 23 is 0 degree. At the upright position, the topmost detent groove 5a engages with the second end portion 42 of the spiral guiding member 4. When the user tilts the housing 2 downwards (i.e. increases the tilt angle 23) without rotating the wheel 3, the curved row of detents 5 slides upwards against the spiral guiding member 4; when the housing 2 is tilted to a desired angle, the user stops tilting and the spiral guiding member 4 then engages with the nearest detent groove(s). This completes the discrete tilt angle adjustment of the housing 2. Similarly, when the user wishes to tilt the housing 2 upwards, the curved row of detents 5 slides downwards against the spiral guiding member 4 and engages with the nearest detent groove(s) when the user stops tilting.

If the user wishes to fine tune the tilt angle 23 of the housing 2, the user rotates the wheel 3. For example, when the housing 2 is at the upright position and the user wishes to increase the tilt angle 23 (i.e. to tilt the housing 2 further downwards), the user rotates the wheel 3 in a counter-clockwise direction to drive the spiral guiding member 4 to slide through the detent groove 5a, and the housing 2 is thereby tilted downwards away from the wheel 3 with the tilt angle 23 continuously changes with the rotation. When the desired tilt angle 23 is reached, the user simply stops rotating the wheel 3, and the biasing action of the biasing means 6 keeps the housing 2 at the desired tilt angle 23. After one complete revolution of the wheel 3, the topmost detent groove 5a engages with the first end portion 41 of the spiral guiding member 4 while the second topmost detent groove 5b engages with the second end portion 42 of the spiral guiding member 4; in other words, one complete revolution of the wheel 3 fine tune the tilting angle 23 of the housing 1 by the angle between successive detent grooves. If the wheel 3 is further rotated counter- clockwise, the spiral guiding member 4 then slides through the second topmost detent groove 5b and after another one complete revolution of the wheel 3, the second topmost detent groove 5b engages with the first end portion 41 and the third topmost detent groove 5c engages with the second end portion 42 of the spiral guiding member 4. If the user at this point wishes to decrease the tilt angle 23 (i.e. to tilt the housing 2 further upwards), the user rotates the wheel 3 in a clockwise direction, the spiral guiding member 4 slides through the second topmost detent groove 5b and after one complete revolution of the wheel 3, the second topmost detent groove 5b engages with the second end portion 42 of the spiral guiding member 4 and the topmost detent groove 5a engages with the first end portion 41 of the spiral guiding member 4.

The above embodiment is one of the embodiments of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A tilt angle adjustment mechanism capable of both discrete and fine adjustment, comprising
   a bracket;
   a housing tiltably connected to the bracket so as to tilt around a tilt axis relative to the bracket in a predetermined range of tilt angles;
   a wheel disposed between the bracket and the housing for adjusting the tilt angle of the housing; the wheel is rotatably connected to the bracket so as to rotate around a rotation axis which is perpendicular to a planar surface of the wheel and perpendicular to the tilt axis;
   a spiral guiding member disposed on the planar surface of the wheel which faces towards the housing;
   a curved row of evenly spaced detents provided at the housing for engaging with the spiral guiding member, which is pressed towards the curved row of detents by a biasing means, to fix the housing to the wheel at plural predetermined tilt angles defined by the detents to achieve discrete tilt angle adjustment of the housing, and rotation of the wheel drives the spiral guiding member to slide through the curved row of detents and causes the tilt angle of the housing to continuously change with the rotation.

2. The tilt angle adjustment mechanism as in claim 1, wherein the spiral guiding member is in form of an approximately one-turn spiral with a first end portion adjacent to an inner side of a second end portion to allow two successive detents to respectively engage with the first end portion and the second end portion.

3. The tilt angle adjustment mechanism as in claim 1, wherein the spiral guiding member is in form of a ridge protruding from the wheel, and the curved row of detents comprises a plurality of detent grooves.

4. The tilt angle adjustment mechanism as in claim 3, wherein the detent grooves are defined by gaps between arc shaped ridges protruding from the housing.

5. The tilt angle adjustment mechanism as in claim 1, wherein the biasing means is in form of a spring arm disposed on the bracket which presses on the wheel at a position corresponding to where the spiral guiding member and the curved row of detents are engaged.

6. The tilt angle adjustment mechanism as in claim 1, wherein the curved row of evenly spaced detents is provided in middle of a bottom edge of a side of the housing which faces towards the wheel.

7. The tilt angle adjustment mechanism as in claim 1, wherein the wheel is knurled at its periphery.

* * * * *